May 17, 1932. T. F. GRAY ET AL 1,858,927
METHOD OF MAKING VALVES
Filed Dec. 31, 1930  6 Sheets-Sheet 1

T. F. Gray
E. A. Bolton
INVENTOR

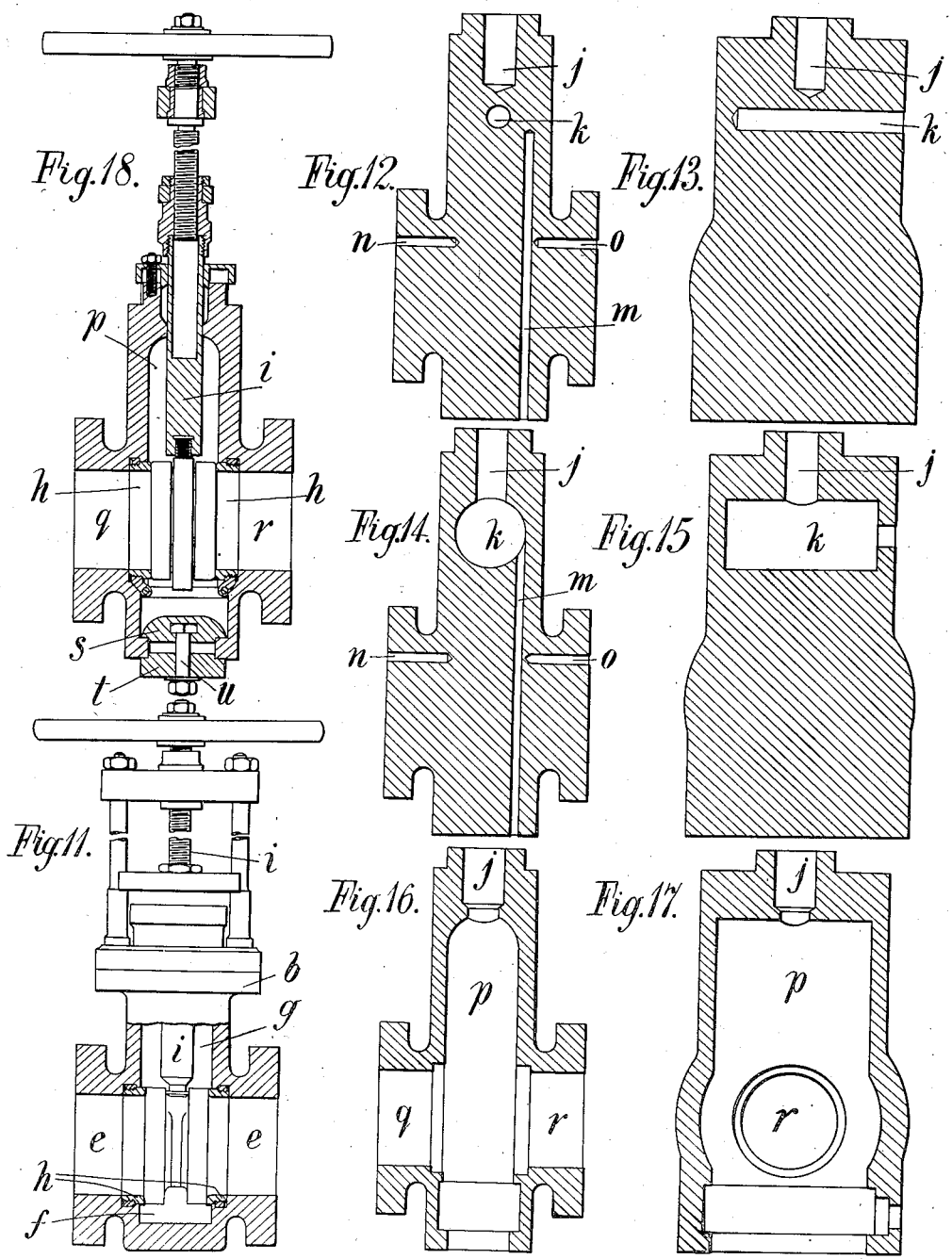

May 17, 1932.     T. F. GRAY ET AL     1,858,927
METHOD OF MAKING VALVES
Filed Dec. 31, 1930     6 Sheets-Sheet 4

May 17, 1932.  T. F. GRAY ET AL  1,858,927
METHOD OF MAKING VALVES
Filed Dec. 31, 1930    6 Sheets-Sheet 5
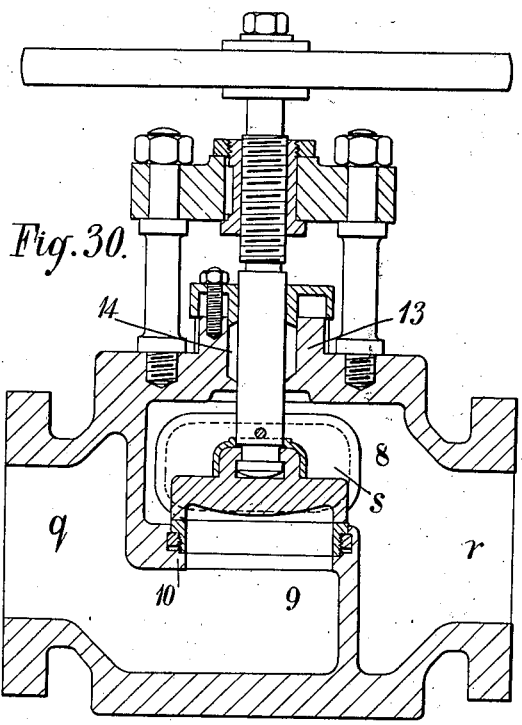
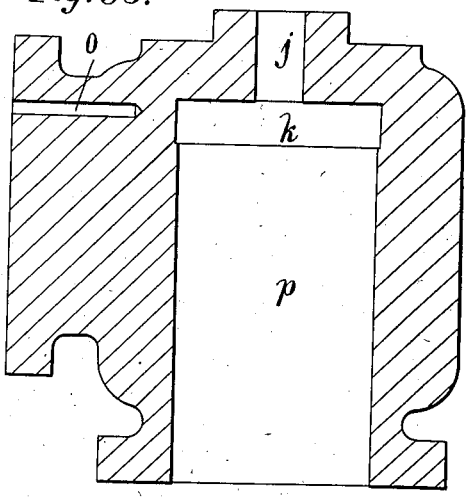
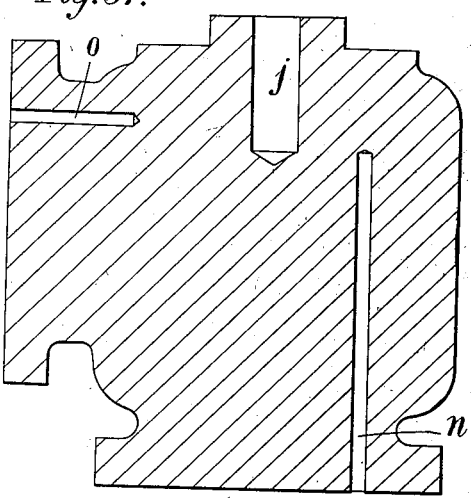
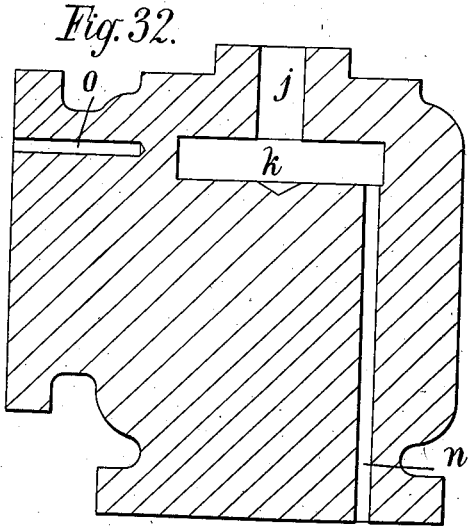

May 17, 1932.　　T. F. GRAY ET AL　　1,858,927
METHOD OF MAKING VALVES
Filed Dec. 31, 1930　　6 Sheets-Sheet 6
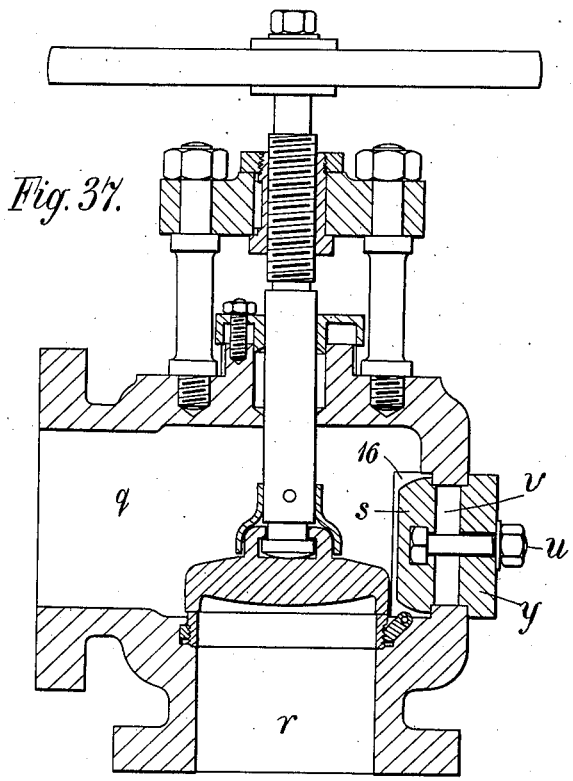
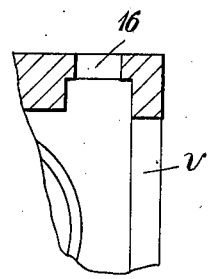
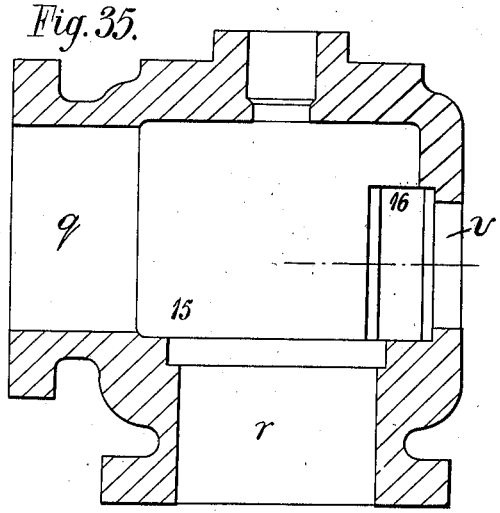
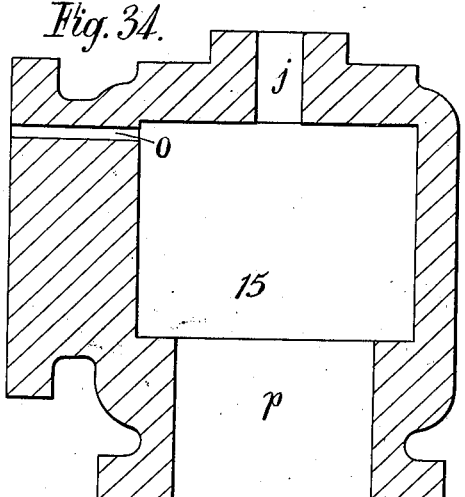

Patented May 17, 1932

1,858,927

UNITED STATES PATENT OFFICE

TOM FREDERICK GRAY AND EDGAR ANDREW BOLTON, OF ADSWOOD, STOCKPORT, ENGLAND, ASSIGNORS TO VICTORY VALVES LIMITED, OF ADSWOOD, STOCKPORT, ENGLAND, A BRITISH COMPANY

METHOD OF MAKING VALVES

Application filed December 31, 1930, Serial No. 505,902, and in Great Britain January 4, 1930.

In the manufacture of valves which are to withstand high pressures and which are of relatively large size, many attempts have been made to avoid the use of steel castings. Small valves of about four inches bore are frequently forged to the required external shape but mechanical difficulties and the question of cost have so far prevented the making of relatively large valves, such as valves of eight inch bore and upwards from one piece forgings.

Our invention comprises the production of a valve from a forging by the combined processes of machining and of flame cutting from machined holes with the oxy-acetylene or other flame.

The invention further comprises the improved processes of manufacture or construction of valves as hereinafter described and claimed.

Referring to the accompanying sheets of explanatory drawings:—

Figures 1 to 10 illustrate the stages in the production of the body of a parallel slide valve from a forging. Figure 11 shows the finished valve.

Figures 12 to 17 illustrate the stages in a modified process for the production of a parallel slide valve. Figure 18 shows the finished valve. Figure 19 is a sectional view taken at right angles to Figure 18 showing the arrangement of the valve cover.

Figure 30 shows the finished valve.

Figures 31–36 illustrate the stages in the production of the body of a junction type valve. Figure 37 shows the finished valve.

The same reference letters in the different views indicate the same or similar parts.

Figure 1:
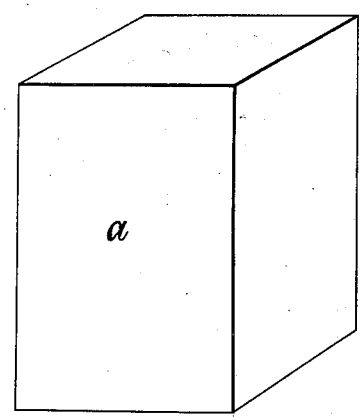
Figure 2:
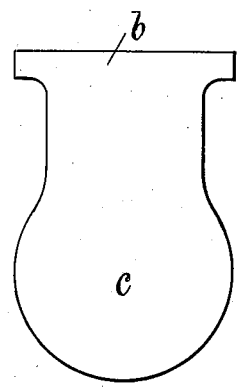
Figure 3:
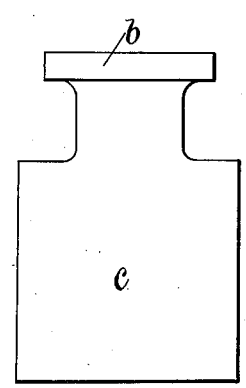
Figures 4, 5:
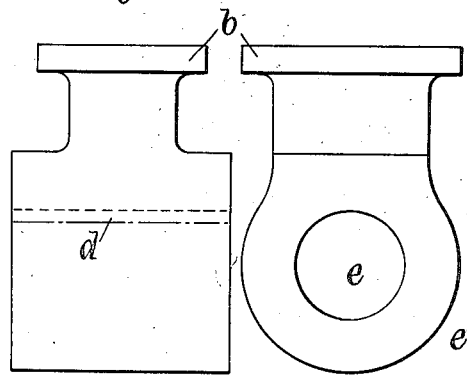
Figures 6, 7:
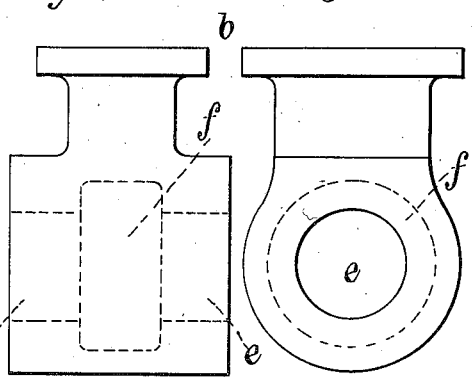
Figures 8, 9:
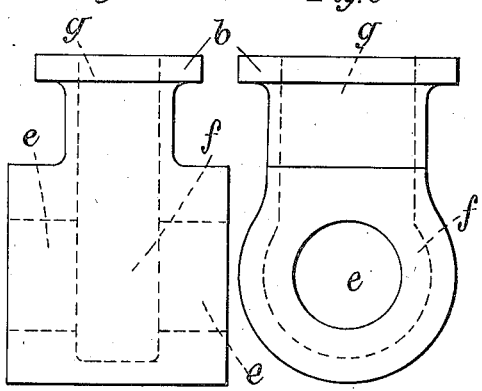
Figure 10:
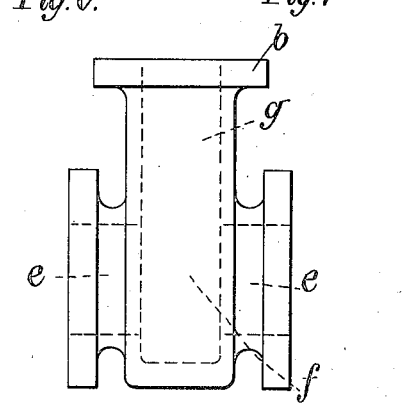

In the application of our invention illustrated at Figures 1–11, the forging $a$ is of a plain rectangular form of the requisite overall dimensions for the size of valve to be produced therefrom and can be made in a press such as is ordinarily employed in the forging of metals. The first operations thereon consist of flame cutting the exterior of the forging to produce one flanged face $b$ and the cylindrical shape $c$ which extends between the other faces, see Figures 2 and 3. Thereafter a small diameter hole $d$ is machine bored through the cylindrical part of the forging, (see Figure 4). By flame cutting the said hole is enlarged to the desired throughway dimensions as shown at $e$ in Figure 5, and thereafter at a point midway between its ends the said hole is enlarged by machining to produce a chamber $f$ as shown in Figures 6 and 7. A further hole $g$ is formed by flame cutting which leads into said chamber $f$ from the flanged face $b$ of the forging, as shown in Figures 8 and 9. The outside of the forging may now be finished to the form shown in Figure 10 by flame cutting and by machining as required.

The valve seats $h$, see Figure 11, may be provided and secured in the valve body in any desired manner. Also the valve operating spindle $i$ and its screw and nut traversing means may be arranged in any suitable manner.

In the method of producing a parallel slide valve from a solid forging, shown in Figures 12–18, we drill an aperture $j$ into the forging from the end through which the valve operating spindle is to pass, another aperture $k$ at right angles to the aperture $j$ at a point approximately at the top of the space in which the valves are to move, and intercepting the axis of the valve spindle aperture $j$, another aperture $m$ which extends from the face of the valve opposite to that in which the valve spindle is to work and into the valve body to a point approaching the top of the space in which the valves are to work, and two further apertures $n$ and $o$ extending inwards in the spaces which will form the valve inlet and outlet branches. See Figures 12 and 13 which are sectional views taken at right angles to one another. The aperture $k$ is enlarged by machining to be of a diameter slightly larger than the width of the space in which the valves are to work. This enlargement is shown in Figures 14 and 15 which are views similar to Figures 12 and 13.

Thereafter by flame cutting or machining and working from the drilled hole *m* previously referred to, the whole of the space in which the valves work is chambered out, as shown at *p* in Figures 16 and 17, such space extending into the machined hole *k* at the top of the space. The branches *q* and *r* are also produced by flame cutting or machining, working from the drilled apertures *n* and *o* previously referred to. The exterior of the valve may be profiled or shaped by flame cutting and/or machining. The valve seat recesses are machined. The end of the hole *k* through the valve body is closed by welding an internal plug therein or otherwise.

Figure 19:
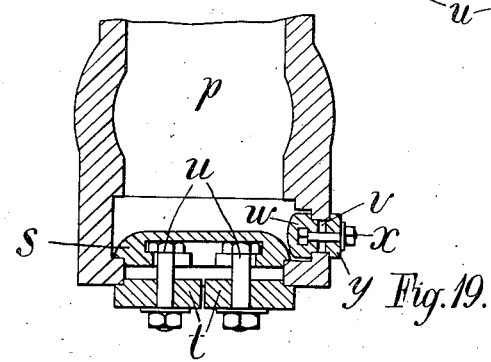

The cover piece *s* for the valve (see Figures 18 and 19 which are sectional views at right angles to one another, the latter figure showing the cover piece portion of the valve only) is inserted into a recess at the base of the space in which the valves work and is held in place by bridge pieces or by plates *t* bearing upon the end of the valve body, the bolts *u* of which have their heads held in undercut slots in the cover piece. Preferably we arrange an aperture *v* in the side of the valve body through which the cover pieces can be inserted into the recesses around the base of the space in which the valves work, such aperture being produced by flame cutting or machining and being closed by a small cover plate *w* secured by bolts *x* and a bridge piece or plate *y*. To remove the cover piece *s*, the plates *t* and bolts *u* are removed, also the bolts *x* and plate *y*. The cover piece *s* is then pushed up at the side where the cover piece *w* is situated to allow *w* to be passed out of the valve body below *s*. Thereafter the cover piece *s* is passed through the hole *v*.

With the arrangement described and with the cover pieces disposed within the valve, it is a simple matter to examine the valve faces without dismantling the valve, for the cover piece can be readily withdrawn without breaking large cover points such as are usual on large parallel slide valves, and the valve spindle *i* with its operating gear need not be disturbed. The valve can then be lowered through the aperture closed by the cover piece *s*.

If the interior of the valve has been formed by flame cutting, it may be finished off by machining.

Figures 20, 21:
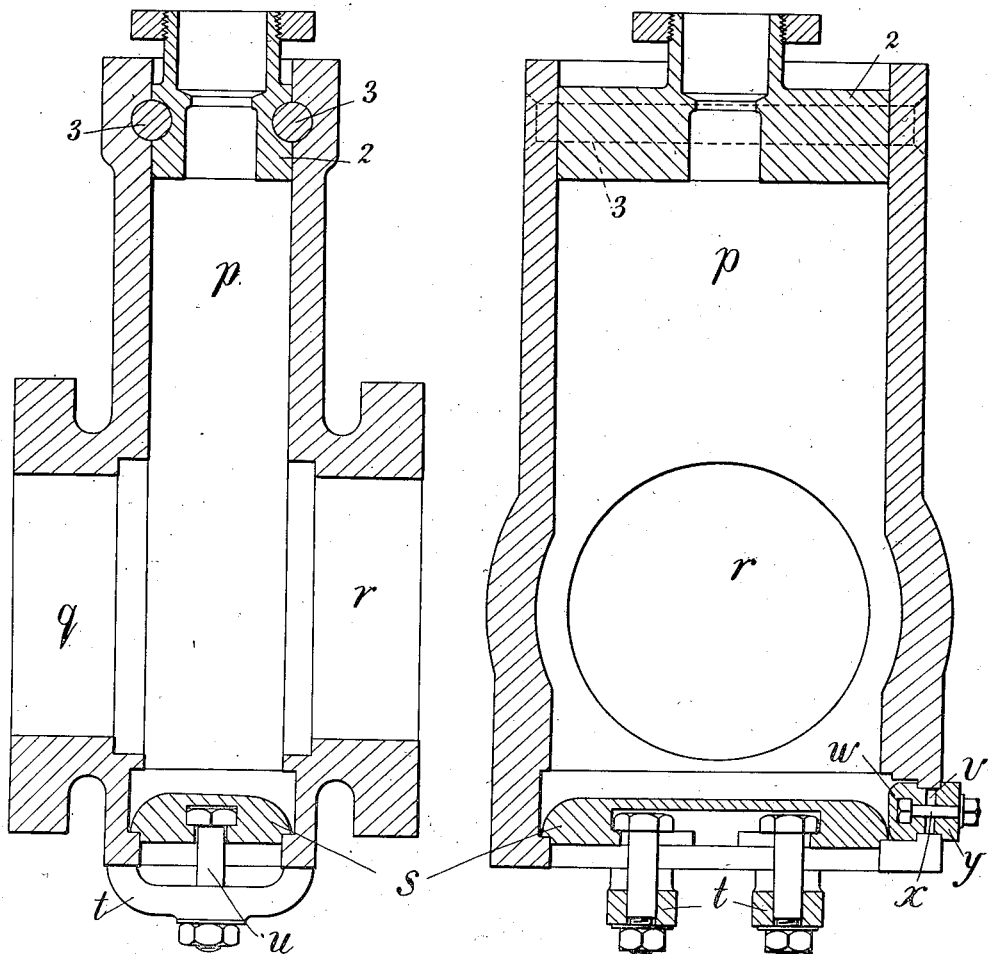
Figures 20 and 21 are sectional views taken at right angles to one another of a modified construction of the parallel slide valve body shown in Figures 12–19.

Instead of drilling a hole as *j* in Figures 12 to 17 in one end of the forging for the passage of the valve spindle only and then machining at *k* in Figures 14 and 15 the top of the space in which the valves work prior to forming such space by flame cutting, we may as shown in Figures 20 and 21 flame cut a hole *p* through the valve from top to bottom to form the space in which the valves work and then secure a block 2 at the upper end of such space through which the valve spindle will work, such block having a stuffing box formed therein. The block may be secured in position by key like parts 3 which enter recesses in the valve body and in the block, the joints being made steamtight by welding.

Figure 22:
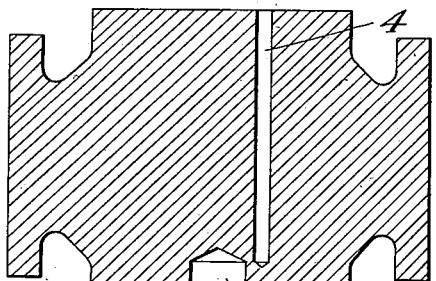
Figures 22 to 29 illustrate the stages in the production of the body of a screw down type valve.
Figure 23:
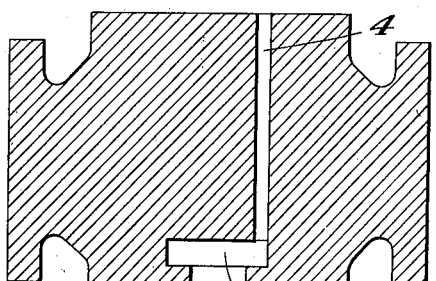
Figure 24:
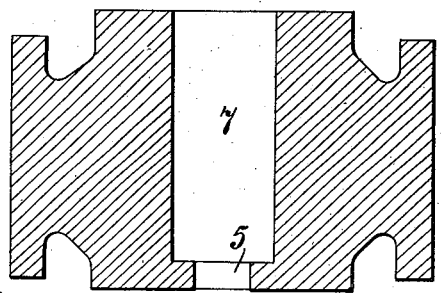
Figure 25:
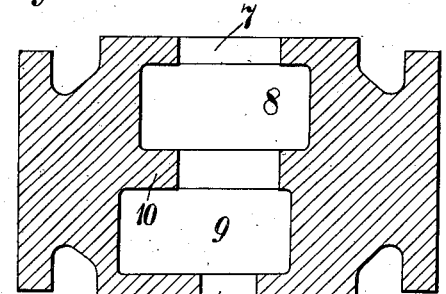
Figure 26:
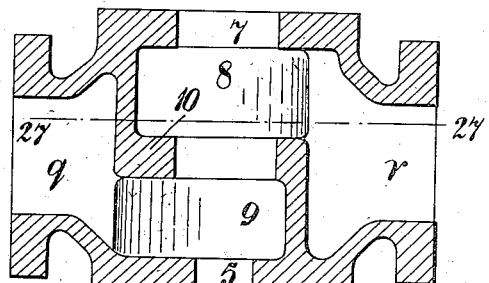
Figure 27:
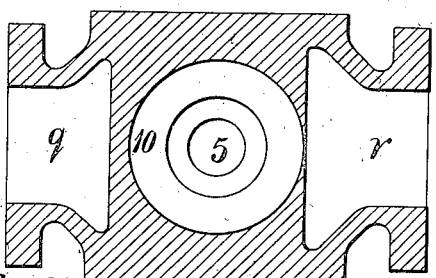
Figure 28:
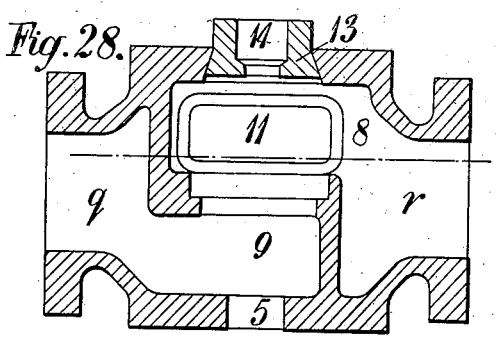
Figure 29:
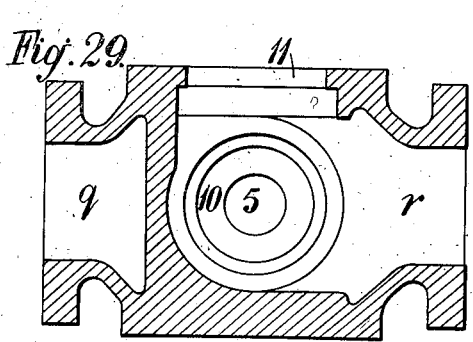

In the case of a valve of the screw down type in which the valve inlet and outlet branches are in line with one another the stages in the production of which are shown in Figures 22–30, the said branches are produced by machining, leaving a solid block of metal between them (see Figure 22). Holes 4 and 5 are then bored into the valve body from opposite sides at right angles to the valve branches. The hole 5 is used for the machining of a small chamber 6 into which the end of the hole 4 breaks, see Figure 23. Working from the hole 4, a chamber 7 is produced by flame cutting and by means of machining, two chambers 8 and 9 are produced above and below a division piece 10 which is to receive the valve seat, see Figure 25. The branches *q* and *r* are now produced by machining as shown in Figures 26 and 27, the latter being a sectional plan view on the line 27—27 of Figure 26. The metal between the chamber 8 and branch *r* is now cut away and likewise the metal between the chamber 9 and the branch *q*. An aperture 11 is cut in the valve casing to permit of the insertion of the valve and its seat, such aperture being closed by an internal cover piece *s* as shown in Figure 30. The block 13 (Figure 28) containing the packing gland 14 is welded into the valve body. The hole 5 is closed by welding an internal plug therein.

In the case of a screw down type of stop valve in which the inlet and outlet are at right angles to one another, see Figures 31–37, the valve body may be produced in a manner similar to that previously described with reference to Figures 12 to 19 for a parallel slide valve, that is to say, a hole *j* may be drilled in the valve body for the passage of the valve spindle and a space *k* be chambered out (in this case by means of a tool inserted through the said hole) to form the top of the space in which the valve is to work. Holes *n* and *o* are then drilled into the body at right angles to one another, one *n* being, for example, through the valve inlet way and the other *o* through the valve outlet way. By flame cutting and machining the passage way through the valve which is of right angle form is produced, starting from the drilled apertures *n* and *o* previously referred to, see Figures 33 and 34. A recess 15 is machined in the valve body for the reception of the valve seat and a gap *v* is cut in the valve body through which the seat can be inserted into position in the valve, and through which also the valve can be passed; such gap is closed by a cover piece *s* (Figure 37) which seats upon an internal shoulder around the gap and is held in place by bolts *u* and external bridges or a plate *y*. The cover piece can be placed in position by tilting it as it is passed into the valve body or a further gap 16 may be provided to permit of the insertion of the cover piece by a sliding movement, such further gap being also closed by a cover piece as in the form of valve shown in Figure 21.

In all the constructions described, the arrangement of the internal covers *s* and *w* have the advantage that the pressure within the valve holds the cover pieces in place and helps to make their joints.

We wish it to be understood that we make no claim in the present application to the arrangement of the internal cover pieces which forms the subject matter of our concurrent application Serial No. 496,242.

What we claim is:—

1. In the production of a parallel slide valve body, machining a hole through a solid forging from side to side where the valve throughway is to be, flame cutting said throughway working from said hole, machining a chamber midway between the ends of said throughwy, and flame cutting a hole from the cover flange of the valve into said chamber.

2. In the production of a parallel slide valve body, drilling holes into a forging from the faces which are to form the inlet and outlet branches, from the face where the valve spindle is to pass through and also from the opposite face, and a further hole at right angles to and intercepting the axis of the valve spindle hole, the last mentioned hole being then enlarged by flame cutting and the body chambered out by flame cutting by working into said enlargement from the face of the forging opposite to the face with the valve spindle hole therein, the valve branches being then hollowed out by flame cutting by working from the holes previously referred to extending from the valve branch faces.

3. In the production of a parallel slide valve body, forming a throughway aperture from side to side and another from top to bottom of a solid forging by drilling and subsequent flame cutting and permanently filling in by welding one end of one throughway aperture where the valve spindle is to pass, and welding to the upper end of said vertical throughway, a block through which passes the valve spindle.

4. In the production of a valve of the screw down type in which the valve inlet and outlet branches are in line with one another, machining the said branches so as to leave a solid block of metal between them, drilling holes into the valve body from opposite sides at right angles to the valve branches, one of said holes being used for the machining of a chamber into which the end of the other hole breaks, enlarging the last mentioned hole by flame cutting and machining to form two chambers above and below a division piece which receives the valve seat, machining the inlet and outlet branches, cutting away the metal between each branch and its respective chamber and cutting an aperture in the valve casing to permit of the insertion of the valve and its seat.

5. In the production of a valve of the screw down type in which the inlet and outlet branches are at right angles to one another, drilling a hole in the valve body for the passage of the valve spindle, enlarging the base of said hole by means of a tool inserted therethrough to form the top of the space in which the valve is to work, drilling holes into the valve body at right angles to one another and subsequently enlarging said holes by flame cutting and machining to form a passageway through the valve which is of right angle form, machining a recess in the valve body for the reception of the valve seat and cutting a gap in the valve body for the insertion of the valve and its seat.

In testimony whereof we have signed our names to this specification.

TOM FREDERICK GRAY.
EDGAR ANDREW BOLTON.